United States Patent
Al-Chalabi

(10) Patent No.: US 7,660,534 B2
(45) Date of Patent: Feb. 9, 2010

(54) OPTICAL COMMUNICATION DEVICE AND SYSTEM USING OPTICAL POWER AND SIGNALS

(76) Inventor: Salah Al-Chalabi, 5 Vestry Mews, Camberwell, London (GB) SE5 8NS ( * ) Notice: Subject to any disclaimer, the term of this patent is extended or adjusted under 35 U.S.C. 154(b) by 755 days.

(21) Appl. No.: 10/480,813

(22) PCT Filed: Jun. 17, 2002

(86) PCT No.: PCT/GB02/02685
§ 371 (c)(1),
(2), (4) Date: Dec. 15, 2003

(87) PCT Pub. No.: WO02/103935
PCT Pub. Date: Dec. 27, 2002

(65) Prior Publication Data
US 2004/0165884 A1 Aug. 26, 2004

(30) Foreign Application Priority Data
Jun. 15, 2001 (GB) ................................. 0114649.7
Apr. 25, 2002 (GB) ................................. 0209483.7

(51) Int. Cl.
*H04B 10/00* (2006.01)
(52) U.S. Cl. ...................... 398/171; 398/113
(58) Field of Classification Search ................. 398/113, 398/171
See application file for complete search history.

(56) References Cited
U.S. PATENT DOCUMENTS
4,326,298 A * 4/1982 Fromm et al. ............... 398/108
4,453,257 A * 6/1984 Lo et al. ...................... 375/296
4,860,279 A 8/1989 Falk et al.

(Continued)

FOREIGN PATENT DOCUMENTS

| EP | 0 639 011 | 2/1995 |
|---|---|---|
| EP | 1 026 839 | 1/2000 |
| GB | 2 056 666 | 3/1981 |
| JP | 56-36245 | 4/1981 |

OTHER PUBLICATIONS

Al Chalabis et al, "Partially coherent sources in interferometric sensors", First International Conference on Optical Fibre Sensors, London, UK, Apr. 26-28, 1983, pp. 132, 135.

(Continued)

*Primary Examiner*—Nathan M Curs
(74) *Attorney, Agent, or Firm*—Nixon & Vanderhye P.C.

(57) ABSTRACT

An optical telephone and communication system with interferometers at the transmitter and receiver can use optical time-delay difference and differential frequency shift modulation and multiplexing techniques. The power to the system is provided from either a remote optical source through the optical network or a local optical source. The optical network provides one or two optical connections to the sets. Part of the optical signal from the network is converted to electrical energy stored in a rechargeable battery. The optical sources used have a known coherence function, wavelength and coherence length Lc. The transmitter converts the information to phase variation in one arm of the transmitter interferometer and the receiver recovers this signal by using a matched interferometer. The path imbalance between the two arms of either interferometer is greater than Lc. Each set is assigned a particular time delay difference and/or differential frequency shift for addressing.

29 Claims, 8 Drawing Sheets

U.S. PATENT DOCUMENTS

| | | | |
|---|---|---|---|
| 4,882,775 A | | 11/1989 | Coleman |
| 4,905,309 A | * | 2/1990 | Maisonneuve et al. ...... 398/168 |
| 5,459,600 A | | 10/1995 | Davis et al. |
| 5,606,446 A | | 2/1997 | Davis et al. |
| 5,714,773 A | * | 2/1998 | Burrows et al. ............... 257/82 |
| 5,986,749 A | | 11/1999 | Wu et al. |
| 6,055,080 A | * | 4/2000 | Furstenau et al. ........... 398/139 |
| 6,362,906 B1 | * | 3/2002 | O'Shea ....................... 398/126 |
| 7,171,129 B1 | * | 1/2007 | Blair et al. .................. 398/203 |
| 2002/0015206 A1 | * | 2/2002 | Hakimi et al. .............. 359/161 |

OTHER PUBLICATIONS

Brosio et al, "A light powered telephone set for an all-optical distribution network" GLOBECOM '82, IEEE Global Telecommunications Conference, Miami, FL., Nov. 29-Dec. 2, 1982, pp. 9-13.

* cited by examiner

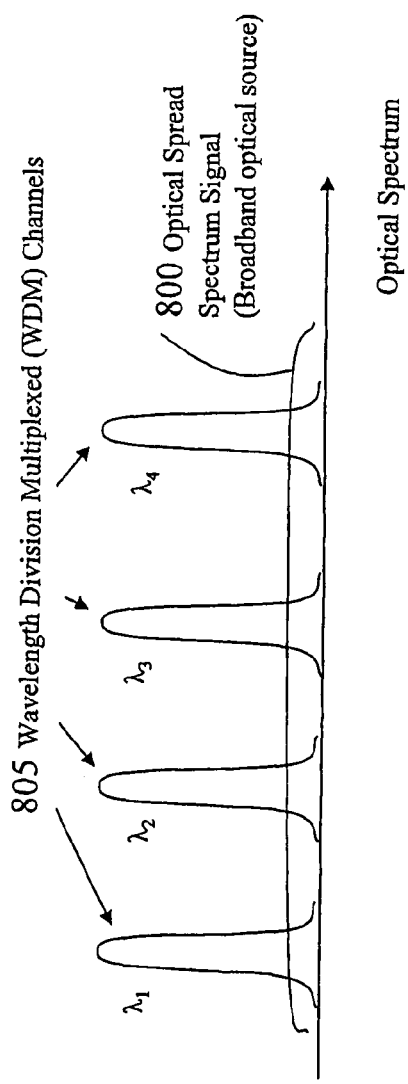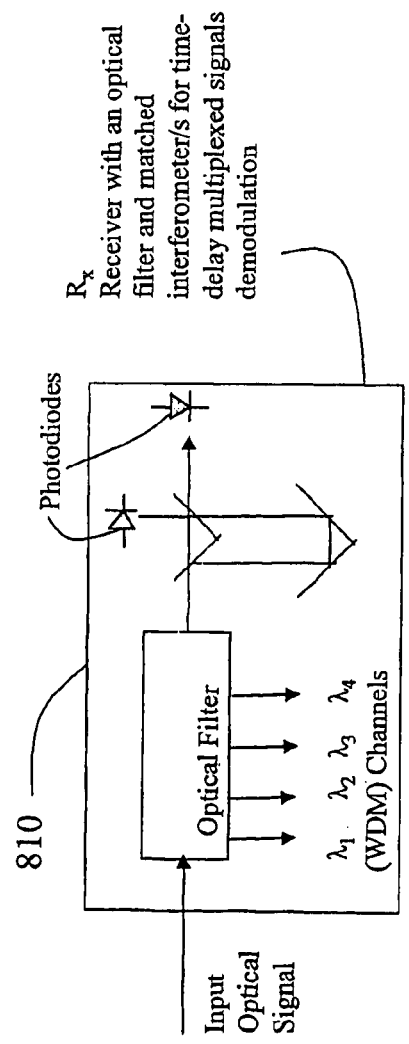
FIGURE 8

OPTICAL COMMUNICATION DEVICE AND SYSTEM USING OPTICAL POWER AND SIGNALS

This application is the US national phase of international application PCT/GB02/02685 filed 17 Jun. 2002 which designated the U.S., the entire content of which is incorporated herein by reference.

The present invention relates to an optical communication device, an optical communication system and/or a method for optical communication.

It is known to use interferometric modulation in optical transmission. For instance, it is known to provide optical signals over an optical fibre by using an unbalanced interferometer at the transmitting end, a matched unbalanced interferometer at the receiving end and a light source of relatively short coherence length. An optical signal containing information can then be transmitted between the two interferometers.

Examples of interferometric modulation are described by S. A. Al-Chalabi B. Culshaw and D. E. N Davies in "Partially Coherent Sources in Interferometric Sensors"; First International Conference on Optical Fibre Sensors, 26-28, Apr. 1983, pp 132-135, published by the Institute of Electrical Engineers and the content thereof is hereby incorporated by reference. A further example is disclosed in U.S. Pat. No. 5,606,446 assigned to Optimux Systems Corporation The terms "coherence function" and "coherence length" are both used in this specification in relation to optical sources used in interferometric modulation. It is known that to use interferometric modulation, the optical paths in the interferometers should be mismatched by an optical path difference which is greater than the coherence length of the optical source carrying the modulation. "Coherence function" and "coherence length" are both known terms and, for the purpose of providing background to the present invention, techniques for measuring them are described as follows with reference to FIGS. 4 and 1.

Referring to FIG. 4, the coherence function of an optical source 237 is measurable using a four port (two input ports and output ports) interferometer, such as a Mach-Zehnder, with two arms with an initial path imbalance of zero. The source 237 is used as an input to the interferometer and optical intensity is measured at one or more outputs 270/272, 425 while the path length difference between the two arms of the interferometer is varied. A plot of measured optical intensity versus path imbalance, or time delay difference, can be used to give the coherence function of the source.

The measure optical intensity includes a DC (direct current) component and a coherence function component. It is known that the coherence function component undergoes a sign reversal in one arm of the interferometer only, due to a phase change at a beam splitter. Hence where the optical intensity measured at a first output equals the DC component plus the coherence function component, the optical intensity measured at a second output equals the DC component minus the coherence function component. This offers a simple way to extract the coherence function component and separate it from the DC component: photodetectors are used to measure the optical intensity at two different output ports 270/272, 425 of the interferometer and then the output currents of the two photodetectors are subtracted. As long as the splitting ratio of the beam splitters used in the interferometer is 1:1, then the coherence function component can be extracted by simply subtracting the currents from photodetectors at the two outputs thus removing the DC component.

Reference to this type of effect in beam splitters and interferometers can be found, for example, in "Coherent Lightwave Communication Systems", by ShiroRyu, published by Artech House in 1995, and in U.S. Pat. No. 4,860,279 entitled "Source modulated coherence multiplexed optical signal transmission system" invented by: Coleman Jeffrey O and Falk R Aaron, with particular reference to FIG. 4.

Referring to FIG. 1, the coherence length of a source can be measured from the same data. The measured photodetector outputs will show multiple maxims (shown as a continuous line) as the path imbalance is varied, this indicated the presence of the interference fringes. The envelope of the plot, shown as a dotted line, gives the coherence function of the source. At some particular value for the path imbalance, the measured photodetector outputs will stop showing further distinguishable maxima and this particular value for the path imbalance can be used as the basis for a workable measure of the coherence length $L_c$ of the source. Different conventions have been used in the past for deciding $L_c$. For instance, it may be measured as the path imbalance at which the coherence function envelope has dropped by a predetermined percentage, for instance 80%.

In practice, a workable value for $L_c$ may be affected by equipment factors such as noise produced by the bandwidth of the photodetector used for intensity measurement. A useful definition of coherence length of a source for use in embodiments of the present invention might thus be based on the maximum discrepancy in path differences between a transmitting and a receiving interferometer for which interference fringes created by the transmitting interferometer using the source can still be detected at the receiving interferometer. It can be expressed according to:

(speed of light)×1/(spectral width of the power density of the source)

A method for plotting a coherence function for use in measuring coherence length based on this useful definition follows. It might be noted that the coherence function (which is the same as the auto-correlation function) and optical power spectral density are a Fourier Transform pair. This means that measuring one will give the other. The coherence function, and hence the coherence length, can be defined as the speed of light divided by the optical spectra width.

A four port receiving interferometer with two arms is given the same path length imbalance as a similar transmitting interferometer. No interferometric modulation is applied and the optical power spectral density at the output of the transmitting interferometer is kept constant. The coherence function can then be obtained by introducing a discrepancy in the path length imbalances of the two interferometers and plotting an output of the receiving interferometer against a range of values for this discrepancy. In detail, the output of the receiving interferometer which is plotted is obtained by subtracting the output currents of photodetectors at the two output ports of the receiving interferometer.

It should be noted that the method described above is for measuring coherence length when equipment factors are taken into account. In order to carry out the method, the path imbalance of the transmitting interferometer must be larger at all times than the absolute coherence length of the optical source which needs to be measured first to establish its value, for instance using a spectrum analyser.

According to a first aspect of the present invention, there is provided an optical network for carrying communication signals to or from transmitting/receiving apparatus in optical form, the network comprising:

i) at least one optical power source for delivering optical power to the transmitting/receiving apparatus for conversion to electrical power at the transmitting/receiving apparatus; and ii) at least one optical signal carrier source for transmitting an optical signal carrier to the transmitting/receiving apparatus for interferometric modulation at the transmitting/receiving apparatus and subsequent transmission over the network as an information-carrying optical communication signal.

In general, the term "interferometric modulation" is used herein to mean modulation applied at an interferometer to an optical carrier input to the interferometer. It encompasses any detectable effect imposed on the carrier by the interferometer, such as a phase or frequency effect applied in an arm of the interferometer, whether or not an interferometer is necessary for detection of the effect. It can also encompass any detectable amplitude or intensity effect applied in one arm of the transmitting interferometer or to the optical power at the input or output of the interferometer. Such modulation might be used for addressing and/or for leading information to a signal.

In practice, the optical power source and the optical signal carrier source may be the same piece of equipment, a portion of the optical signal carrier being used at the transmitting/receiving apparatus for conversion of delivered optical power to electrical power.

Some of the optical power delivered might be stored after conversion by means of a rechargeable battery and some of the optical power might be used directly on conversion to drive one or more aspects of the transmitting/receiving apparatus.

It has been recognized in making the present invention that signalling of the general type described above, using interferometric modulation, is particularly appropriate in optical communications. This is very much so in an optical network where the network is provided by fibre right to an end point, such as a data terminal or telephone, and in which power is delivered to the end point by optical means. In such an environment, the power budget can be limited, potentially severely. However, interferometric modulation can be applied using very little, or even zero, electrical power at the transmitting/receiving apparatus as long as an optical signal carrier is delivered to the transmitting/receiving apparatus to which the modulation can be applied. For example, movement produced by acoustic means such as the voice can be used to modulate the optical signal carrier along one arm of an interferometer and thus produce a signal directly.

The question of electrical power supply at the receiving end arises for example where public voice networks are concerned. Known telephone systems use wires, mainly copper, to conduct electrical power to telephone apparatus. However, it is desirable in an optical network to supply the required power over the optical connection/s used for voice and/or data communication so that there is no need for any wires. Today's public telephone system provides electrical power to the telephone apparatus from the telephone exchange or local switching board to enable the apparatus to function without the need for an additional local power supply. This remote power provision makes it possible for the apparats to be used in emergencies, such as fire or failure of the electricity supply from the electricity grid. These similar requirements are expected to be met by telephones and communications systems using optical communication systems deployed in public or private networks.

In recent years, the power levels of optical sees and amplifiers for optical fibre systems have increased to the level where it is possible to provide sufficient power over an optical connection to drive opto-electronic devices and to generate ringing sound (the telephone bell). These optical power levels may be limited however by the on-set of non-linear effects in the optical communication channel, or by international standards on safe optical power levels in optical communication channels, and it is for this reason that the power budget at transmitting/receiving equipment can be particularly constrained.

In embodiments of the present invention, it is feasible to construct a voice/data system which extracts all its power from the network. A primary attraction is that it is not necessary to employ an optical source in the transmitting/receiving equipment but to supply an optical signal carrier to it which can be modulated at the transmitting/receiving equipment. This means a very significant reduction in the power required at the transmitting/receiving equipment. It is an option that an optical source is local to the transmitting/receiving equipment but a remote optical source can be provided as well or instead.

The main devices that will still need to be driven at the transmitting/receiving equipment will depend on the application. For instance, in the telephony case this will include devices such as photodetectors, biasing circuits, amplifiers, loudspeakers (ear piece), microphone, ringing bells, electro-optic modulator or piezoelectric devices.

Embodiments of the present invention preferably use an interferometric technique for both signal modulation and addressing. Some form of addressing is usually important where different signals can be sent by any one of several transmitters (eg broadcasting where each transmitter is assigned an address) and/or received by any one of several receivers (eg telephony and/or data communication where each receiver is assigned an address). The addressing is used to identify either the transmitter or the receiver or both. To provide interferometric addressing, an interferometer is used to apply a distinctive attribute to the optical signal transmitted by a optical path lengths of the two arms of an interferometer are deliberately different by a predetermined amount, producing an "unbalanced interferometer". As long as a transmitting interferometer and a receiving interferometer are matched, then optical signals can be carried between them. Other distinctive attributes, in conjunction with time delay difference, such as frequency modulation produced by a moving part in the interferometer might be used, or an amplitude modulation, produced for instance electrically at or in association with the interferometer.

The term "time delay difference" between the two arms of an interferometer as used herein refers to the difference in time taken by optical radiation to travel through each arm of the interferometer. The "time delay difference" equals the difference in optical lengths of the two arms of the interferometer divided by the speed of light. "Frequency shift", supporting frequency modulation, means the shift in the rate of change of phase of optical radiation which can be caused by a change in optical path length in time. "Differential frequency shift" refers to a difference in frequency shift between optical radiation travelling in one arm of the interferometer with respect to optical radiation travelling in the other arm of the interferometer.

Distinctive attributes of this type are not mutually exclusive and it would be possible to increase the number of distinguishable addresses, and/or the information content, by using a combination of two or more different types, such as both an unbalanced interferometer and a frequency or amplitude modulation.

Where an unbalanced interferometer is used for addressing, it is not necessary that the transmitting and receiving interferometers are both unbalanced so as to be perfectly matched. If two unbalanced interferometers are perfectly matched, the difference in path lengths for each interferometer is the same as for the other. However, if two unbalanced interferometers are not perfectly matched, there arises a discrepancy in the differences between their path lengths. This discrepancy should however be less than the coherence length of the optical source used for signalling in order for a positive match to be made and the fringes recovered at the receiver.

When the path inbalance of an interferometer is greater than the coherence length of the source, no interference pattern is normally observable in the output of the transmitting interferometer (ignoring here the more complex case where interference will be observed other than the pattern around the zero path length difference). However, when that output is fed to the receiving interferometer, the interference pattern will be recovered as long as the discrepancy in the differences in path lengths between the two if is less than the coherence length of the source $L_c$. When the discrepancy is zero, i.e. the two interferometers have identical path length differences, then the interference pattern can be recovered to a maximum extent. As long as the interference pattern can be recovered, any changes in the first interferometer can be tracked by the second interferometer which enables an optical signal to be received.

Two or more in interferometers can be used to transmit multiplexed signals over he same optical connection, and importantly can share the same optical source, provided that the discrepancy in their path length differences is greater than the coherence length of the source Lo and preferably significantly greater, such as three times eater when a partially coherent source is used This provides clean separation between the signals intended for different receiving interferometers. Thus if a first interferometer "n" has a path difference "$L_n$" and a second interferometer "m" has a path difference "$L_m$", then the interferometers can be resolved provided that $$L_n - L_m > L_c$$

where
$L_n$: is the path length difference of the nth interferometer
$L_m$: is the path length difference of the mth interferometer
$L_c$: is the coherence length of the optical source Thus there might be provided a multiplexing optical communication system as an embodiment of the present invention, which system comprises:
i) an optical network for carrying multiplexed communications signals; and
ii) at least first and second optical modulators for use in modulating one or more optical carriers to produce the communications signals, wherein each of said first and second optical modulators comprises an interferometer having, in use, a difference in the optical paths through it, and wherein there is a discrepancy between the difference in the optical paths through the first optical modulator and the difference in the optical paths through the second optical modulator, said discrepancy being greater than the coherence length of the one or more optical carriers.

In such a system, the communications signals produced by the respective optical modulators can be distinguished at receiving apparatus and can therefore be multiplexed in the optical network, along the same fibre if necessary.

The system may further comprise one or more optical sources for providing the one or more optical carriers for the communications signals.

It is not necessary that the optical carriers have the same coherence length, as long as the above condition regarding said discrepancy is not broken.

It is again useful that the system uses interferometric addressing. A pair of interferometers can then be selected for making a communications connection from one to the other in the manner of dialling a telephone number in voice communications. Information about the precise nature of the imbalance which must be matched by one unbalanced interferometer in order to communicate via another, target unbalanced interferometer can for instance be stored with respect to equipment connected to the network, again in the same manner as conventional switching or routing in communications.

In embodiments of the present invention, there is more than one way in which a path length difference can be applied. It can for instance be a static path length difference, measurable for example as a phase difference in the optical radiation output from respective arms of an interferometer, or it can be a dynamic change in path length. This can be measured as a frequency difference in the optical radiation output from respective arms of the interferometer: ie a Doppler shift.

Thus in embodiments of the present invention, there may be provided an optical communication system, the system comprising:
i) an optical network for carrying communications signals; and
ii) at least one optical modulator for use in modulating one or more optical carriers to produce a communications signal, the modulator comprising an interferometer having, in use, a difference in the optical length of the optical paths through it wherein said optical modulator is adapted to modulate by varying said difference in optical path length.

It might be noted that if the path length difference is applied dynamically, it is possible but not essential that transmitting and receiving interferometers in such a system also show a matching imbalance in the sense of having one arm with a permanently different path length. If they are also unbalanced in this way, the number of addresses available can be greatly increased since there are then two variables available for each address, the static path length difference and the Doppler shift or differential frequency shift.

Either or both of the path length difference and the Doppler shift could also or instead be used to carry information rather than just providing addressing. For instance, changes in path length are detectable and can therefore themselves carry information while changes in the Doppler shift applied at the transmitter can also clearly be used to convey information.

In practice, it is also possible to use amplitude modulation at a transmitter as either an addressing component or to carry information. This again extends the number of addresses that would be available, and/or the amount of information an optical channel can carry. Amplitude modulation would not usually be applied as interferometric modulation but by a separate amplitude control device or changes in drive to an optical source.

Conveniently, each piece of transmitting/receiving equipment can act as either a transmitter or a receiver, in the manner of a telephone or computing apparatus. Alternatively, for instance for use in broadcasting, there may be provided at least one piece of equipment designed for transmission or reception only.

Each piece of transmitting/receiving equipment can be identified on the network by assigning its interferometer(s) a specific path length imbalance and/or a specific differential frequency shift between the two arms of the relevant interferometer.

According to a second aspect of the present invention, there is provided optical receiving apparatus for receiving optical signals over a network, which apparatus is provided with at least two interferometers for receiving interferometric modulation, a first interferometer being arranged for use in detecting a first type of modulation in an incoming signal and a second interferometer being arranged for use in detecting a second type of modulation in an incoming signal.

The first type of modulation might for instance comprise phase or frequency modulation and the second type of modulation might for instance comprise intensity modulation.

Preferably, the at least two interferometers are differently unbalanced, the discrepancy between the path length differences of the interferometers being equal to, or approximately equal to, a quarter of a central wavelength of an optical carrier carrying the incoming signal. This gives optimal detection of both types of modulation, phase/frequency and intensity, and can be described as the interferometers being in "quadrature".

"Central" in this context may mean average, or centrally placed in a range of wavelengths, or other similar qualification found appropriate in particular circumstances of use.

Conveniently, the optical receiving apparatus may further comprise a path length control component for producing a path length change in relation to both interferometers at the same time. This is particularly efficient where there is a first interferometer which is used to detect phase or frequency modulation and a second interferometer, in quadrature therewith, which is used to detect intensity modulation. The first interferometer might be used to track the phase or frequency modulation and the tracking result can be used in a feedback loop to the path length control component to both interferometers at the same time, so that both interferometers can be adjusted to follow said phase or frequency modulation.

It will be understood that references to path length in this context are references to optical path length. Therefore the path length control component could be anything capable of changing optical path length, such as a piece of electro-optic material which changes refractive index in response to changes in an electric field, or a piezo-electric material which changes the physical length of the path. However, a convenient arrangement is one in which the at least two interferometers share at least one reflector as the path length control component, the arrangement being such that movement of the shared reflector results in said path length change in relation to both interferometers.

In an embodiment, the at least two interferometers might be provided by one shared pair of reflectors, at least one of which is a retroreflector, the apparatus further comprising at least one input beam splitter, the arrangement being such as to provide multiple optical paths in relation to the reflectors which can be brought together as outputs to constitute said at least two interferometers.

The invention also encompasses optical transmitting apparatus for use with optical receiving apparatus according to the second aspect, the transmitting apparatus comprising means for applying intensity modulation to an optical signal carrier.

It has further been realized in making the present invention that it has advantages in a wavelength division multiplexed communication system in that it can provide an extra channel, outside the wavelength division multiplexed channels.

According to a third aspect of the present invention, there is provided a receiver for use in receiving wavelength division multiplexed signals in optical communications, said receiver comprising a filter for filtering out one or more wavelength ranges carrying wavelength division multiplexed signals from an incoming optical carrier, wherein the receiver further comprises an interferometer for use in detecting interferometric modulation in a portion of the incoming optical carrier remaining after said filtering out.

The invention in this third aspect takes advantage of the use of an interferometer to extract a signal from an optical carrier which has already had wavelength division multiplexing channels filtered out. That is, it has been recognized that there can be sufficient optical bandwidth left in such an optical carrier to carry a detectable signal.

In relation to embodiments of the invention which comprise systems, the invention may also or instead be embodied as a transmitter and/or a receiver for use in such a system. Further, in another aspect, an embodiment of the invention might be provided by a method of communication within such a system, or by a method of communication using such a transmitter and/or receiver.

Power delivery by optical means is known. An example in an optical bus system is disclosed in European patent application EP 1026839 in the name Phoenix Contact GmbH & Co. In most circumstances, the optical sources used to provide the power and optical signal to the network in an embodiment of the present invention should produce as much power as possible and have well defined wavelength and coherence functions. The sources used for communication and providing power should preferably have a well defined coherence function with a coherence length $L_c$ which is less than a specified value. To ensure that the coherence function of the source is well behaved and independent of the reflections from the optical network, optical isolators and polarisation controllers might be required to reduce the effects of such reflections. These types of sources can be combined with optical sources of narrow linewidth and specified wavelength to provide power to the optical communication set. The latter sources are used only to provide power at a specific wavelength and are filtered by the transmitter and/or receiver optical system to be converted to electrical power.

On or more embodiments of the invention will now be described, by way of example only, with reference to the accompanying drawing in which:

BRIEF DESCRIPTION OF DRAWINGS

FIG. 8 illustrates an embodiment of the invention used in combination with wavelength division multiplexing techniques.

DETAILED DESCRIPTION OF A PREFERRED EMBODIMENT OF INVENTION

Network

Figure 2:
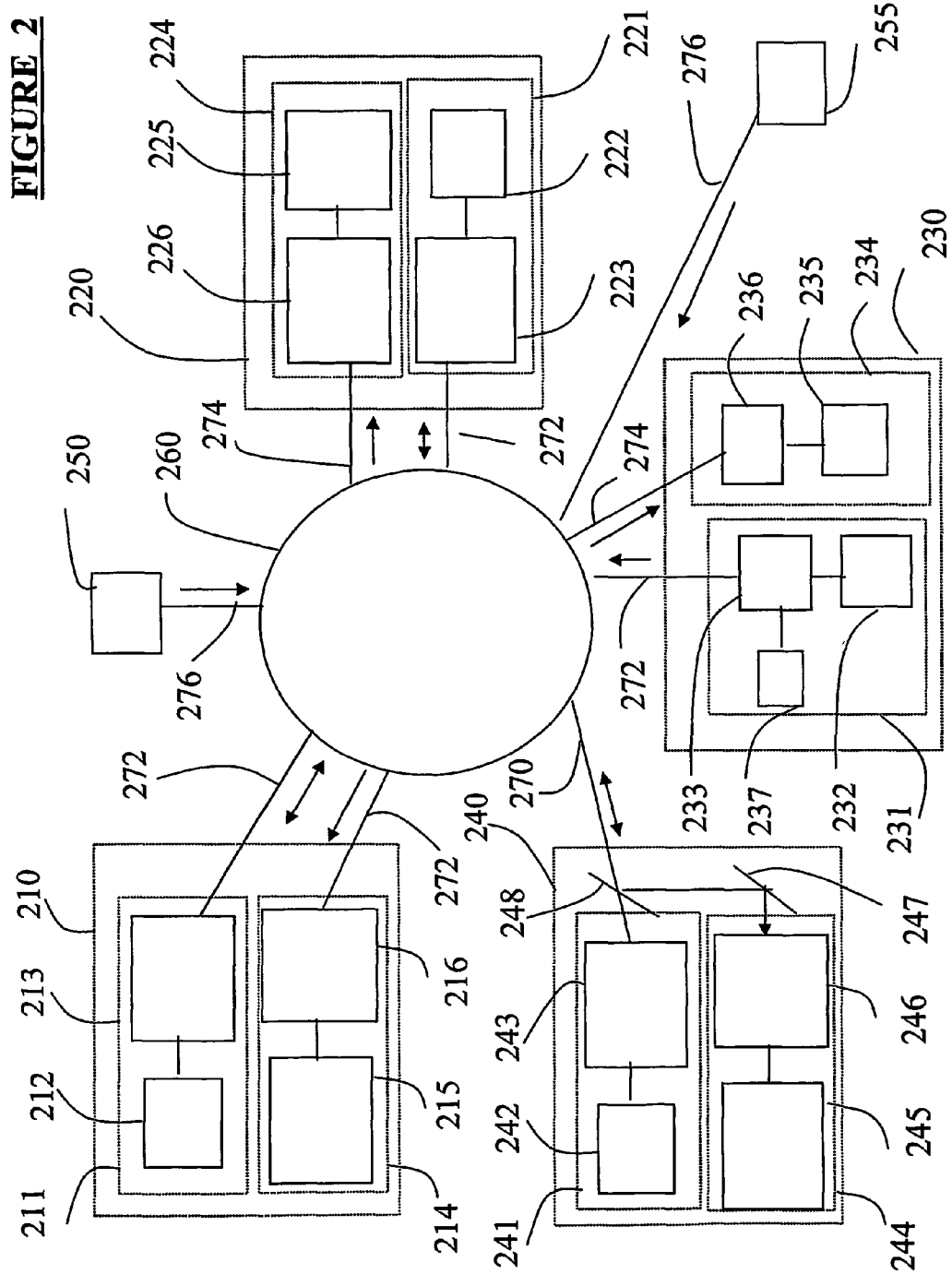
FIG. 2 shows the general optical telephone and communication system together with an optical network.

Referring to FIG. 2, the optical telephone and communication system comprises one or more optical telephones and other communication sets 210, 220, 230 and 240 together with one or more optical sources 250, 255 and an optical network 260. The network can be built from passive optical components; such optical fibres and couplers, and active optical components such as optical power splitters, amplifiers and switches. The optical sources and communication sets are connected to the optical network through various types of optical connection 270, 272, 274 and 276. For example, a first connection type 270 is one connection for two-way communication, a second connection type 272 connects the transmitter module in a two way two connection communication, a third connection type 274 connects the receiver module in a two way two connection communication, and 276 connects an optical source 250, 255 to the network.

In general, the network should provide an optical path between two or more optical telephones and communications modules with sufficient optical bandwidth to enable the use of optical sources with a coherence length less than Lc.

The communications sets 210, 220, 230 and 240 can be one of two general types. The first type, such as 210, 220 and 240, does not have an optical source and derives most if not all its power from the optical sources 252 and 255 and other optical sources connected to the network. The second type of optical telephone and communications sets, such as 230, contains an optical source, such as 237, and can derive some of its power from a local electrical power source. All optical sources must have a well specified optical power spectral density, or a coherence function, and those that are used for communication rather than just power have a coherence length less than a specified value Lc which should be as short as possible.

The optical sources 250, 255 should be powerful enough to provide enough optical energy to operate the telephone and communication sets 210, 220 and 240 of the first type. The main factors that limit the power levels of these sources are safety and performance quality of the voice and communication channels. The optical power received by the optical telephone and communications and converted to photoelectric current should be sufficient, either directly or through a rechargeable battery, to drive the electronic, electromechanical and magnetomechanical systems and devices to effect voice and/or data communication system.

Each optical telephone and communication set consists of a transmitter module 211, 221T, 231, 241 and a receiver module 214, 224, 234 and 244. The transmitter module consists of an optical system part 213, 223, 233, 243 with an interferometer of a specified path length imbalance greater than Lc, and an opto-electronic part 212, 222, 232 and 242 with electronic components and transducers to convert an acoustic signal and data to modulation of the phase, amplitude and/or frequency shift of the optical signal in one or both arms of the interferometer in the transmitter. The transmitter module can use an optical signal generated by a remote or a local optical source, in either case with coherence length less than Lc, for communication.

Figure 6:
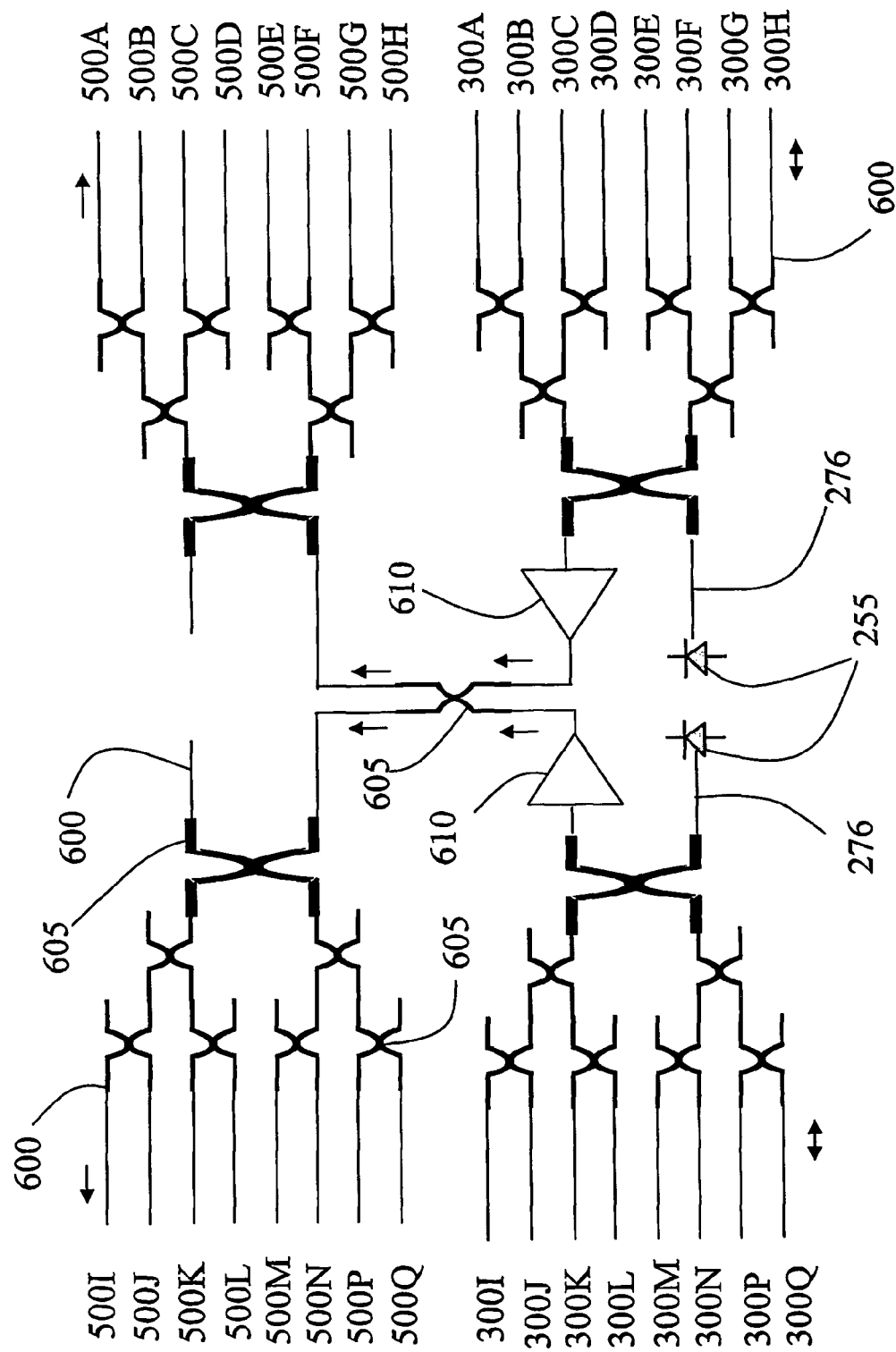
FIG. 6 illustrates an optical network built using passive optical components; such as optical fibres and optical couplers, and active optical components such as optical amplifiers.

An embodiment of the optical network which provides two connections for two way communication is shown in FIG. 6 which consists of optical fibres 600, optical couplers or power splitters 605, and optical amplifiers which may be either unidirectional or bi-directional 610. The connection to the receiver module 500N of the Nth optical telephone and communication, for example the receiver for set 1 is 500A, and the connection to the transmitter of the same Nth set, for example the transmitter of set 1 is 300A. Similarly the connection to the receiver module of the optical telephone and communication set 2 is 500B and the connection to the transmitter of the same set is 300B.

Transmitter Module 211

Figure 3:
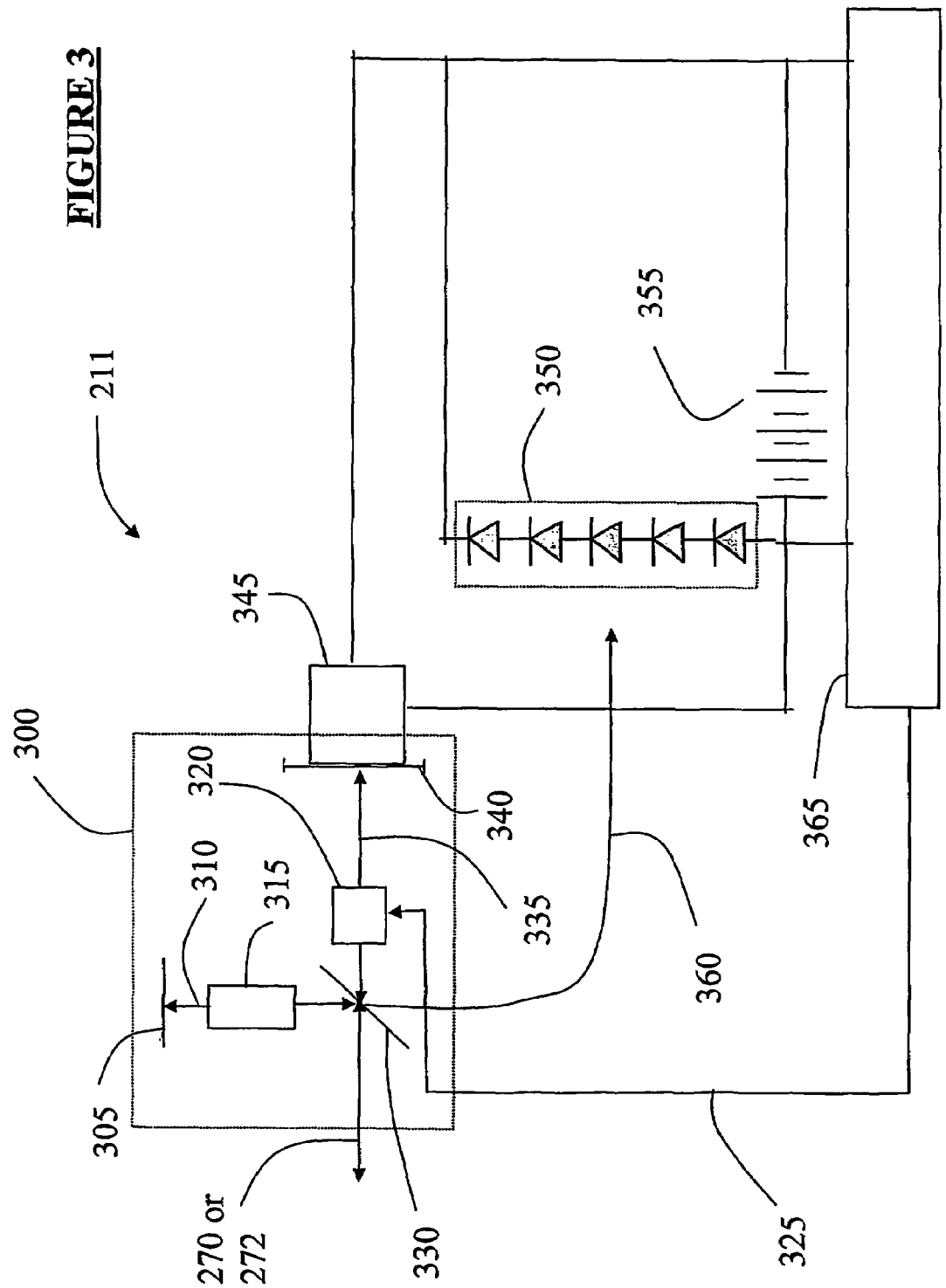
FIG. 3 illustrates the transmitter opto-electronic system with interferometer, photocells, a transducer for converting the voice pressure to optical time delay, phase and/or frequency shift modulation, and data transducer converting the electrical signal representing the data to optical time delay, phase and/or frequency shift modulation.

Referring to FIG. 3, a transmitter module 211 which uses a remote optical source as a power source and signal carrier derives all its power from the optical network through its optical connections 270 or 272. The transmitter module 211 comprises a Michelson interferometer 300 where the optical power splitter 330 splits the optical carrier coming from the network through connections 270 or 272 to two arms or paths 310 and 335. The optical signal in each arm 310, 335 can be travelling in either free space or guided media such as optical fibre or integrated optical device. The optical path imbalance of the two arms 310 and 335 is greater than the coherence length Lc of the relevant source and matches the optical path imbalance of the two arms of the receiver interferometer with which the communication is to be established.

The incoming optical carrier is modulated by introducing one or more of a phase shift, a frequency shift and a time delay to one or both arms of the interferometer 300. This can be done using for example a voice transducer 345 and/or a data transducer 315.

In more detail, a first reflector 305 in the Michelson interferometer is static, while a second reflector 340, which can be a reflective diaphragm, is coupled to a voice transducer 345 which can convert an acoustical signal and pressure to phase and /or frequency modulation of an optical signal in one arm 335 of the interferometer 300. The data signal meanwhile can be imposed on the phase and/or frequency of the optical carrier in one of the arms 310, 335 by the data transducer 315.

The voice diaphragm 340 can be displaced either directly by an acoustic signal, or after amplification of an electrical signal representing the acoustic signal, and acts as the reflecting mirror of one arm of the interferometer. The motion of the diaphragm due to the acoustic signal will cause phase modulation of the optical carrier in that arm. This phase modulation can also be referred to as a Doppler shift in the optical frequency due to the motion of the reflector 340. The voice transducer can have many other implementations including those using guided optics or bulk optics where phase or frequency modulation is achieved using electro-optic, magneto-optic, piezoelectric transducers. For example, the mirror 340 could be provided as a piezoelectric transducer which is driven by the telephone's microphone. However, all implementations perform the same function of converting sound pressure to optical phase and/or frequency modulation. In general, the voice diaphragm needs to produce movement sufficient to be detected, that is, sufficient to cause a phase/frequency shift that can be detected interferometrically. This can be as low as a nanometer optical path length change. The diaphragm should also have sufficient sensitivity and dynamic range (say 40-50 db) to insure that the signal is not distorted.

The data transducer 315 comprises a phase or frequency modulator in one arm of the transmitter interferometer. As well as introducing data, this phase/frequency modulator can also be used for addressing or multiplexing purposes where a specified phase/frequency shift of the optical signal in one arm of the interferometer with respect to the other arm can be used to assign each transmitter a specific code or a part of the available spectrum of differentially frequency shifted signals. Thus the data transducer 315 can be used for assignment of an address to a transmitting/receiving assembly by modulating/demodulating the phase/frequency at a distinctive rate—which is usually higher than that of the voice diaphragm 340.

In this general scheme, a difference in the time delays of the transmitter and the receiver interferometers needs to be less than the coherence length of the optical source, and each receiver with this particular time delay difference can be assigned a particular part of the spectrum of the differential frequency shifted signal. The phase modulator when used for addressing should produce an effective optical path change greater than the central wavelength of the optical source, while phase modulation which conveys information/data should produce an effective optical path change which is determined by the required depth of modulation which enables satisfactory demodulation. The data transducer 315 can have many implementations including for example guided lithium niobate devices, electro-optic crystals, microelectromechanical systems (MEMS) and vibrating mirrors. However, all implementations perform the same function of converting information to phase/frequency and/or amplitude modulation.

Figure 4:
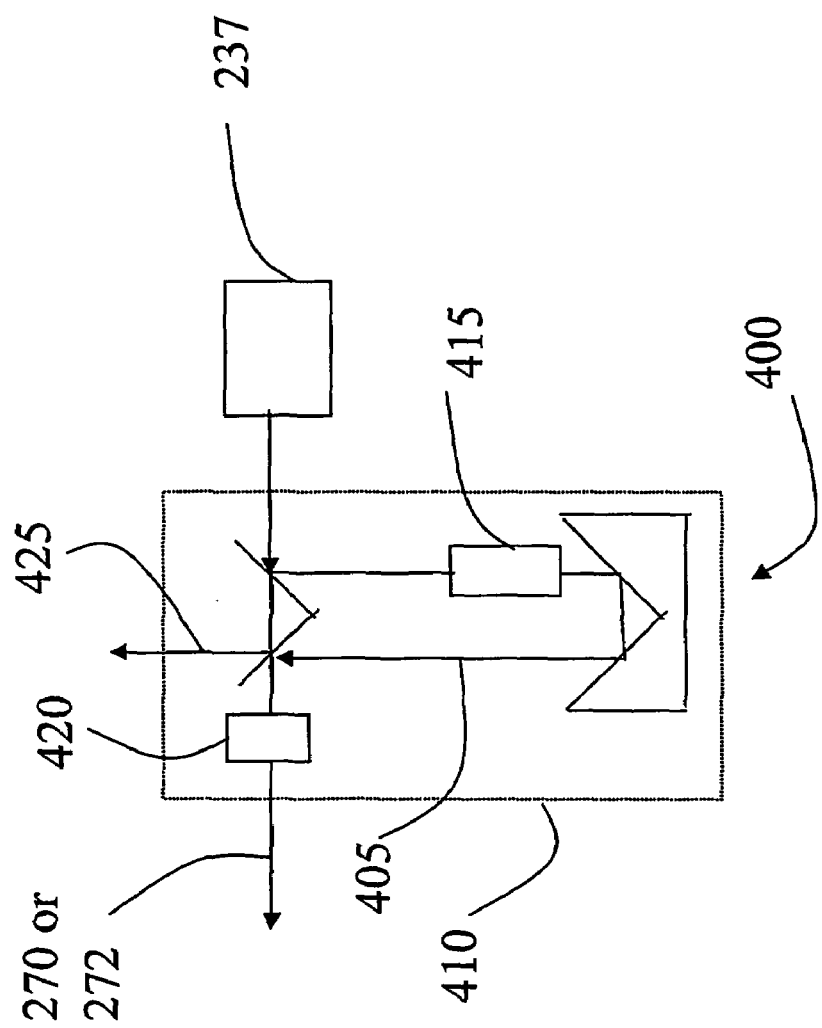
FIG. 4 illustrates a transmitter module with a local optical source, interferometer and phase, frequency or amplitude modulation for data communications system.

Referring to both FIGS. 3 and 4, as an alternative to the voice and data transducers described above, an amplitude or intensity modulator 320, 420 can be used in an arm or at the output of the transmitting interferometer to apply data or voice signals delivered over a connection 325 from the signal processor 365. Examples are an electro-absorption device and a semiconductor optical amplifier whose gain can be controlled electronically. Another example is an acousto-optic modulators but these are usually bulky and require a lot of power to drive them.

Thus phase, frequency and amplitude/intensity modulation can be used simultaneously to transmit information.

The reflected signals from the two arms of the interferometer 300, having been through voice and data transducers 345, 315, are then combined and re-split by the optical power splitter 330 to provide a modulated output signal to the network and a power input to the photocells 350 of the transmitter module 211. That is, the power splitter 330 outputs a first part of the combined signals to the optical network 260 through the optical connection 270 or 272 and a second part to the photocells 350 through an optical connection 360. The photocells 350 convert incident optical power to electrical power which can be partly or completely stored in a rechargeable battery 355 which can then provide electric power to drive the systems and circuits of an optical telephone and communications set as required.

It is an option to use an optical source of a specified wavelength to provide power only. In this case, an optical filter can be inserted at the input to the interferometer 300 and the filtered optical power can be taken directly to the photocells 350.

Hence the transmitter module 211 comprises:
an interferometer 300
an optical power splitter 330 to divide optical power received from an optical source into a first part fed to photocells 350 and a second part fed to the network as a modulated signal
one or more photocells 350 for converting optical power to electrical power
optionally an optical filter so that an optical power source of a specific wavelength can be used to provide power only a rechargeable battery 355 for storing the electrical power generated by the photocells.
a voice transducer 345 to convert an acoustic signal generated by the user to a phase or frequency shift modulation of the optical carrier in one arm of the transmitter interferometer.
a data transducer 315 to convert information in an electric signal to a modulation of the phase and/or frequency of the optical carrier in one arm of the transmitter interferometer
a signal processor to process voice and data signals and to generate suitable electrical signal to drive the voice and data transducers 345, 315

Although the signal processor is not shown in FIG. 3, or discussed in detail above, in practice the signal processor 565 will usually be shared with the receiver module and is shown in, and discussed below with reference to, FIG. 5. In the transmitter, it performs any necessary processing of signals prior to modulation and controls conversion of optical to electrical power for driving local components. Additionally, where the optical connection is via a single optical connection used both for transmission and reception, the transmitter might also have an optical filter to separate different parts of the optical spectrum where one part can be used for transmitting and the other part can be used for receiving.

As mentioned above, the transmitter module 211 might use either a remote optical source or a local optical source. FIG. 4 shows the use of a local optical source 237 for communication, which could in practice be used in conjunction with a remote source. Whether local or remote, the optical source should preferably have a coherence length less than Lc and a well-defined coherence function. Further, the output power of the transmitter module 211 should be sufficient to give a good signal to noise ratio at the input of a receiver for adequate voice quality and data communication whether digital or analogue.

In the arrangement of FIG. 4, the output of the optical source 237 is fed to a Mach-Zehnder interferometer 410 having a path imbalance between the two arms 405, 400 which is greater than the coherence length Lc of the source and equals the path imbalance (or time-delay difference) of the two arms of the receiver interferometer with which communication is to be established. Data information can again be imposed on the phase and/or frequency of an optical carrier in one or both arms by a data transducer/modulator 415.

Receiver Module

Figure 5:
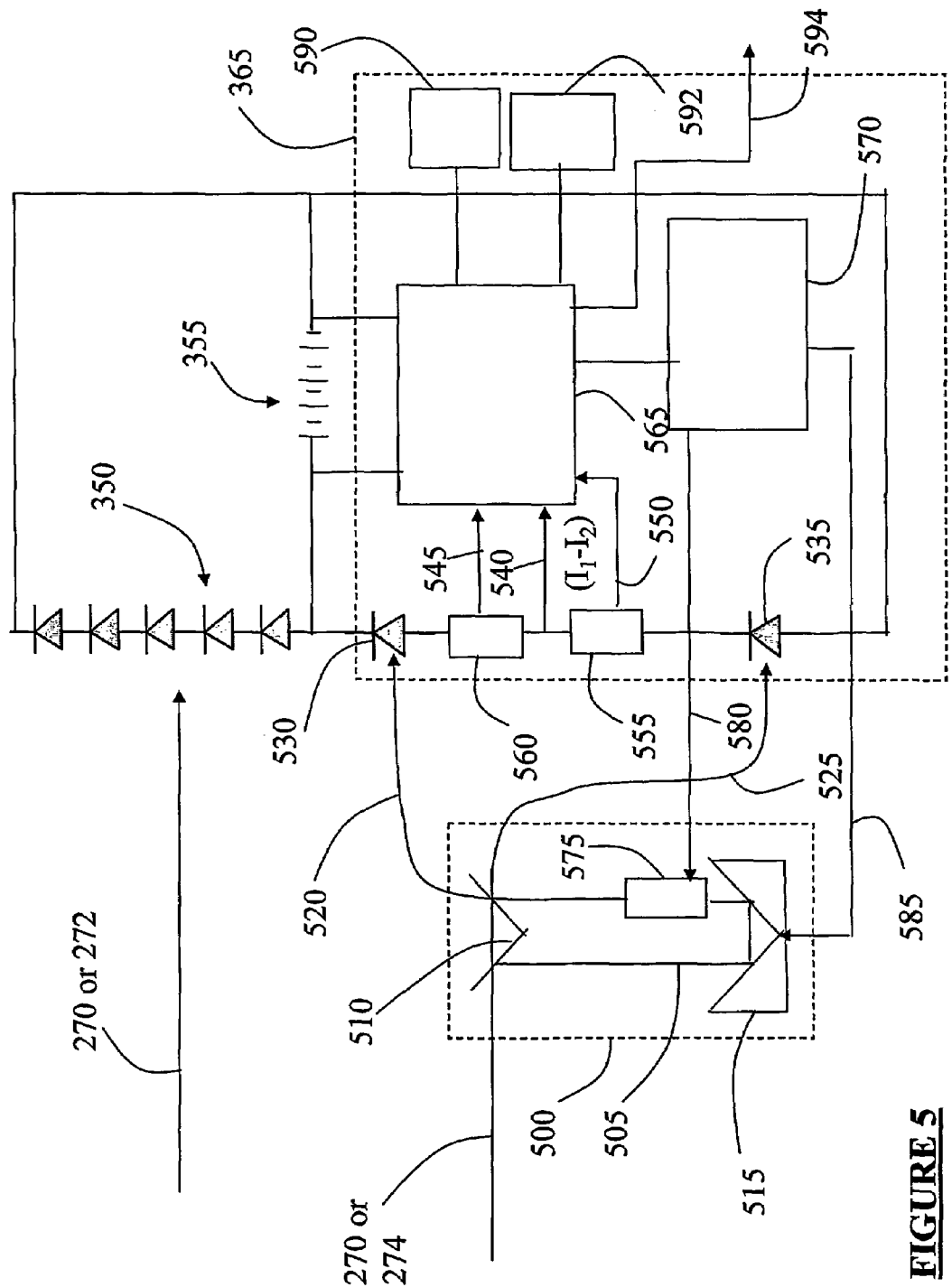
FIG. 5 illustrates the receiver for the optical telephone and data communication system for recovering voice and data information.

Referring to FIG. 5, each optical telephone/communication set 210, 220, 230, 240 will usually also incorporate a receiver module. FIG. 5 shows an embodiment of a receiver module 214, 224, 234, 244 together with photocells 350 and a rechargeable battery 355.

The receiver module 214 comprises an interferometer 500 whose path imbalance should match, to within less than the coherence length of the source, the path imbalance of a transmitter interferometer sending voice and/or data The preferred type of interferometers in the receiver are those with two outputs such as an off-set Michelson or a Mach-Zehnder, although a resonator type such as Fabry-Perot could also possibly be used. The interferometer 500 may also have other optical components such as polarisation controllers or optical dispersion compensators to maximise the optical signal and match the spatial distribution of radiation travelling in each arm of the interferometer.

A correctly addressed optical signal, received at a receiver module 214 from the optical network through a connection 270, 272, will consist of at least two components with a time-delay difference equal to the time delay difference between the two arms 505, 510 of the receiver interferometer 500. A voice channel will occupy the frequency spectrum which was allocated to it by the relevant transmitter while a data channel will occupy other frequencies of the demodulated signal.

The optical outputs 520, 525 of the interferometer 500 are guided or focused onto photodetectors 530, 535 which can be connected in series. The two photodetectors are connected in such a way as to generate a difference current proportional to the difference in intensities of the outputs of the interferometer 500. The difference current is fed through a connection 540 to a signal processor 565.

The signal processor 565 receives both the difference current ($I_1$-$I_2$) and a signal directly proportional to the currents of the photodetectors 530, 535 to extract voice and data information. That is, the two detectors 530, 535 can also be connected to a circuit whose output represents the total optical power from the two arms of the interferometer. Such a circuit might comprise for example resistors 560, 555 where the voltage across the resistors 560, 555 is proportional to the sum of the photodetectors' currents. The voltages across the resistors 560, 555 are fed through high impedance connections 550 and 545 to the signal processor 565.

The signal processor 565 processes the electrical signals to extract and demodulate the transmitted voice and data information and to separate the channels that are assigned different addresses such as different differential frequency shifts or amplitude modulation frequencies.

There are several ways to process the signal from the photodetectors. An optimum way is to find a match between the time delay and differential frequency shifts of the transmitter interferometer and the receiver interferometer to yield a maximum difference between the photocurrents of the two photodetectors. In a preferred method, this can be done by requiring the signal processor 565 to generate a first signal selected from a set of signals agreed with the transmitting end and fed to a frequency and/or phase modulator 575 in one arm of the interferometer 500, through the connection 580, and to generate a second signal to a reflector 515 in the same arm of the interferometer 500, through a feedback system 570 and connection 585 of the receiver interferometer 500. The first modulation signal is used to identify the addressing signal and the second signal is used to recognise the phase modulation imposed by the transmitter.

For example, a sawtooth modulation of the optical frequency in the transmitting interferometer can be used for addressing and the information/data can be conveyed by modulating the phase difference between the two arms of the transmitting interferometer where the sawtooth period is smaller than the information/data period. To identify this signal, the receiving interferometer will apply a sawtooth signal to one phase/frequency modulator in one arm of the receiving interferometer and another signal to the other phase/frequency modulator. When the signal processor generates a sawtooth signal of the same period and frequency shift as the transmitter, the data signal can be demodulated by selecting the phase signal applied to the second phase modulator in the receiver interferometer that matches the transmitted phase. Using this signal processing technique, the receiver can identify the address of the transmitting interferometer and recover the phase/frequency information imposed at the transmitter interferometer. (The exact feedback signals and circuit will depend on the signal processing technique used to extract the voice and data information as well as the time delay, phase and differential frequency modulators and compensators.) These generated feedback signals can then be used to demodulate and recover the information from the phase and/or frequency difference between the two components of the input to the receiver interferometer with a time delay-difference equals the time-delay difference between the two arms of the transmitter interferometer.

A less preferred method is to match the path imbalances of the receiver interferometer to the transmitter interferometer and then pass the difference current between the two photodetectors 530, 535 through a bank of electrical filters to recover the data information. The output of each electrical filter will correspond to a particular transmitter and the information/data can then be recovered by the signal processor. In the case of frequency shift keying scheme, where the information/data is conveyed by a change in the frequency agreed with the transmitter, the signal processor can then monitor the frequency from each electrical filter and compare it using a frequency discriminator, or electrically coherent detection, to decide which frequency was transmitted. Similar signal processor can be used where the information/data is conveyed by changes to the phase, and in this case a phase locked loop or a standard electronic phase detection can be used to decide whether a one or a zero is transmitted in the case of a digital communication system. (This less preferred method may also might require the signal processor to generate signals to drive feedback circuits for modulating the phase and/or difference frequency shift of the optical signals in either arm of the receiver interferometer.)

The optical system described in this invention can be used to enable voice and data communication using analogue or digital modulation schemes. The system can use standard signalling protocols to establish and terminate a telephone call. This will require that the signal processor 565 can also ensure production of the electrical current to drive a standard telephone ringer 590, the voice signal to the earpiece or speaker 592 of the optical telephone and the recovered data to the data channel 594 of the optical communication set The waveform to drive the ringer will determine the ringing sound and the ringer can be of a piezoelectric or an electromechnical type requiring very small drive current preferably less than a milli-ampere. The signal processor is also used for demodulation and amplification of the voice signal and producing the required electronic signal levels to drive the earpiece in the telephone.

Thus a receiver module 214 as shown in FIG. 5 comprises:
- an interferometer with path difference greater than the coherence length Lc of the optical sources.
- photodetectors for collecting the two outputs of the interferometer
- a signal processor
- optionally a feedback circuit from the output of the signal processor to drive phase and/or frequency modulators The receiver might also have an optical filter to separate M different parts of the optical spectrum for use by different channels. For instance, one part of the optical spectrum might be used for transmitting and another part used for receiving, or an interferometric modulation system according to an embodiment of the present invention might be combined with a more conventional system using wavelength division multiplexing techniques.

For amplitude demodulation schemes, the receiver might also have two interferometers in quadrature as explained in a later part of this specific description.

Addressing

As mentioned above, assignment of addresses to identify the optical telephone and communication sets in this invention can be based on assigning a particular time delay difference (greater than the equivalent coherence length of the optical source) and differential frequency shift for the optical interferometers in the receiver and transmitter modules. The assignment of a particular time-delay and/or differential frequency shift to the optical interferometers depends on the use of the communications system. The following communication schemes are covered by this invention: one-to-one, one-to-many or broadcasting, many-to-one, and many-to-many.

In the case of one-to-one communication, the receiver interferometer of each set is assigned a specific time-delay difference and a specific differential frequency shift The path imbalance of the transmitter interferometer is adjusted to match the path imbalance of the receiver interferometer within the coherence length of the optical source with which the voice and/or communication channels are to be established. The voice and data channels for that specific time delay difference can be allocated to one or more specified differential frequency shifts. In a data communication system, several sets can be assigned the same time delay difference but they then have to be assigned different differential frequency shifts to facilitate one-to-one communication In the case of the one-to-many communication system, the transmitter interferometer of one set is assigned a unique time delay difference and differential frequency shift. The time delay difference and differential frequency shift of the receivers' interferometers of the other sets must be adjusted to match that of the transmitting interferometer to establish a one-to-many or broadcasting communication.

In the case of many-to-one communication, the receiver interferometer is assigned a specific time delay difference and one or more differential frequency shifts. The transmitting sets have to adjust their transmitter interferometer to match this time delay and differential frequency shift.

In the case of many-to-many communication within a group of transmitters and receivers, the receiver interferometer and the transmitter interferometer of all communication sets in the group are set to the same time delay difference and differential frequency shift. The time delay difference of all interferometers in the receivers in the group are set to match the time delay difference assigned to all transmitting interferometers. The transmitting interferometers can then transmit at the same differential frequency shift. Alternatively, each transmitter is assigned a specific differential frequency shift to avoid interference, however, the receiver should be able to demodulate the differential frequency shifts of all transmitters.

Receiver Module With Double Interferometer

Figure 7:
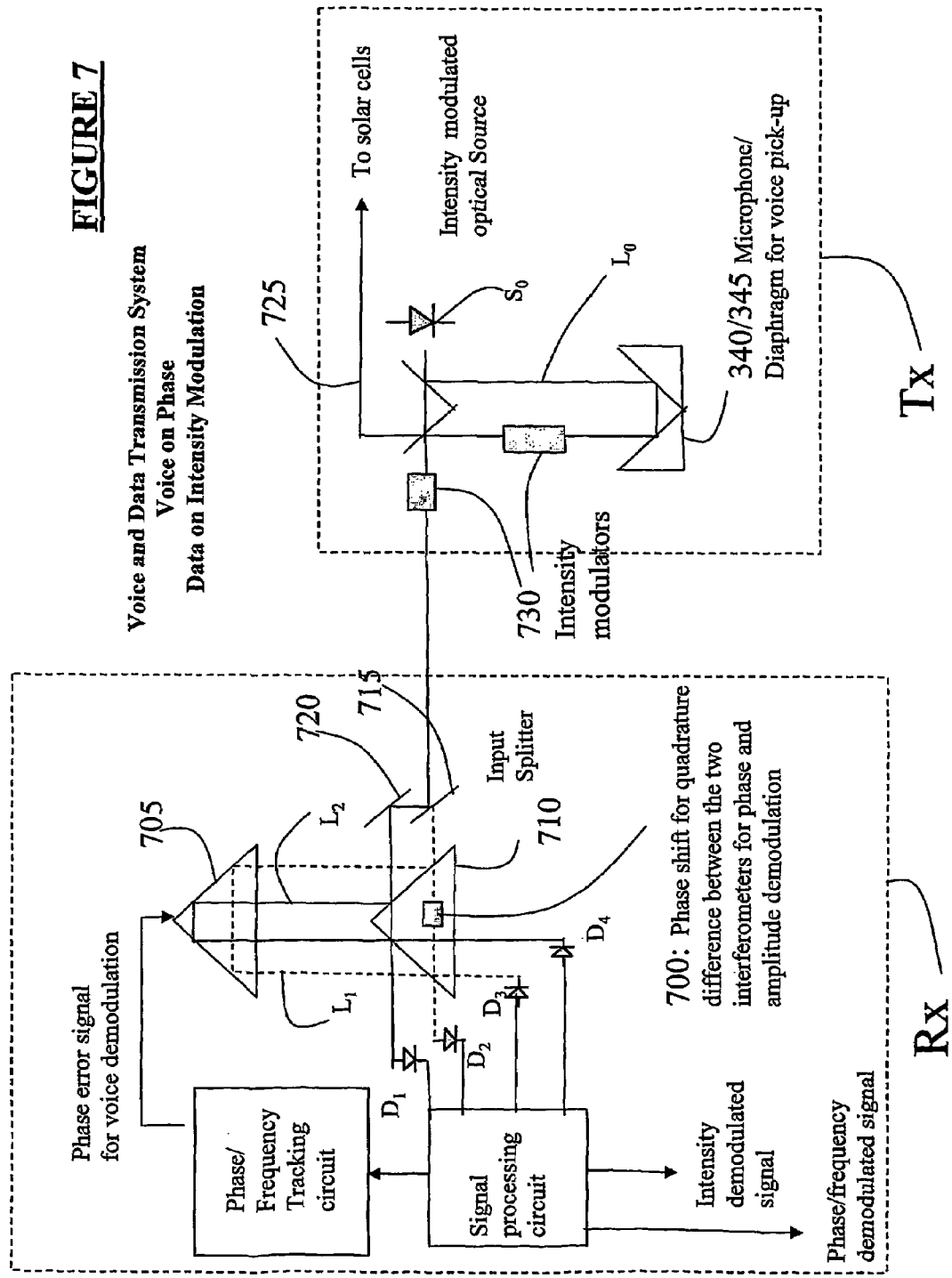
FIG. 7 illustrates an embodiment of the invention using both phase and intensity modulation.

Referring to FIG. 7, the transmission system described above can be used to convey information from a transmitter $T_x$ to a receiver $R_x$ by modulating the intensity of an optical signal either by directly modulating an optical source or by using an intensity modulator 730 outside or inside the interferometer. This method can be used in addition to transmitting information by modulating the path difference, and thus relative phase or frequency difference of the transmitter interferometer. The transmitter interferometer can be the same as that described above, where the optical signal is supplied from the network. It has a characteristic path difference for addressing purposes but now also carries the intensity modulation as well as any phase or frequency modulation.

To demodulate the intensity and the phase/frequency signals separately, the receiver has a pair of interferometers. A first receiving interferometer of the pair is used to track the phase or frequency modulation and the second receiving interferometer of the pair is used to detect intensity modulation.

As shown in FIG. 7, only one pair of retroreflectors 705 and the beam splitters 710 is used to provide both interferometers. This is done by using a beam splitter 715 at the input so that some incoming radiation passes straight to the first retroreflector 710 while the rest of the incoming radiation is diverted to a reflector 720 and reaches the first retroreflector 710 at a different point. This produces four different paths through the retroreflectors 605, 710 as shown, two for each interferometer. The two paths for a first interferometer are represented by the solid lines received at the detectors $D_1$ and $D_4$ and the two paths for a second interferometer are represented by the solid lines received at the detectors $D_2$ and $D_3$. There is a path difference within each interferometer, because the radiation takes different paths through the retroreflectors, and an additional phase shift component 700 is positioned in one of the paths of one of the interferometers so that the two interferometers show different respective path differences. The discrepancy in path differences provided by the phase shift component 700 is a quarter of the central wavelength of the optical source providing the incoming signal, putting the two interferometers in quadrature, and the reason for this is that:

the intensity modulation is best detected when the path imbalance of a receiving interferometer is exactly matched to the path imbalance of the transmitting interferometer in contrast, phase/frequency modulation is best detected using a discrepancy in the path imbalances which produces a phase delay equivalent to a quarter wavelength of the carrier because carrier intensity variation is then zero as detected at the receiving interferometer.

Figure 1:
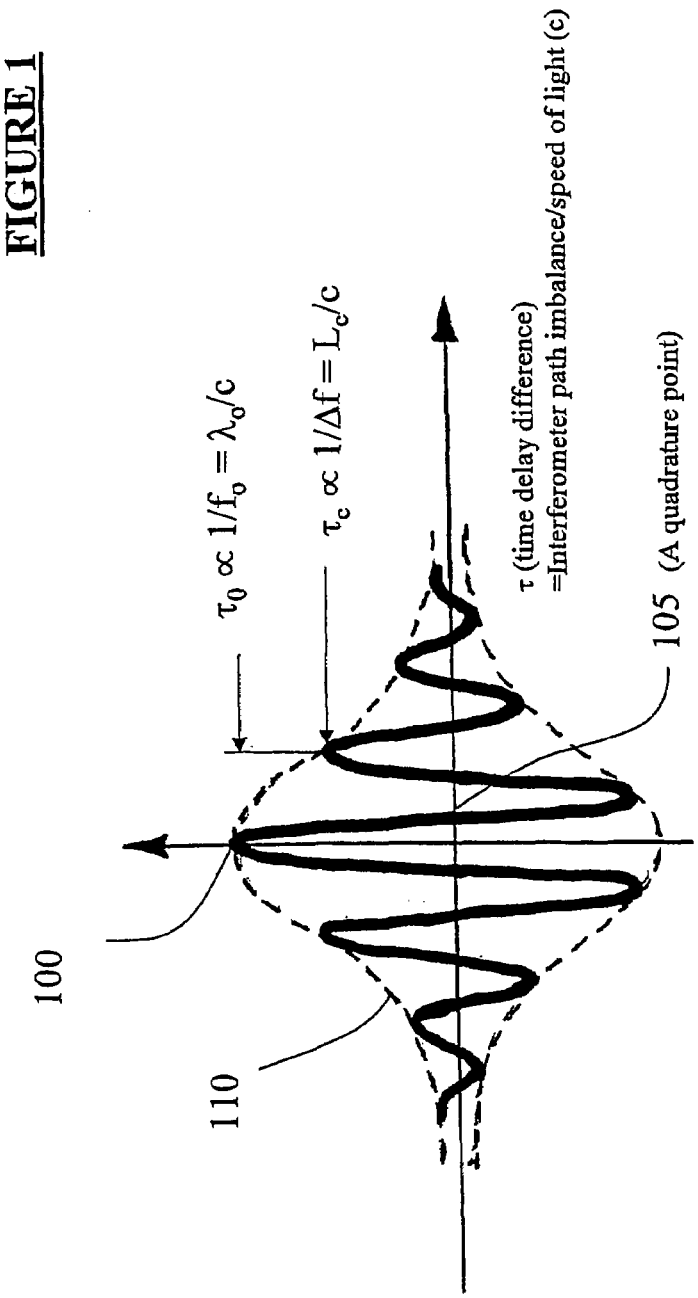
FIG. 1 illustrates a coherence function of a type relevant to an optical carrier.

As discussed above, FIG. 1 shows the effect of changing the discrepancy in path length differences between a receiving interferometer and a transmitting interferometer on the difference in photodetector outputs for the receiving interferometer. (In FIG. 1, the discrepancy in path length is shown as the equivalent time delay, along the "x" axis.) Within the envelope shown as a dotted line (the coherence function 110 for the optical source), the discrepancy in path lengths is varied from a negative value to a positive value, both of which are equivalent to just over three times the central wavelength of the source. It can be seen that maximum output intensity is detected at the receiving interferometer when the interferometers are exactly matched, seen as the peak detected intensity 100. However, at a path imbalance of one quarter the wavelength of the source, shown as a "a quadrature point" 105, zero output intensity is detected and this is the best path imbalance at which to detect phase/frequency demodulation.

Hence it is optimal to use a receiver which has two interferometers with different path imbalances which are in quadrature, i.e. the discrepancy in their path length differences is a quarter of the central wavelength of the optical source providing the signal carrier.

In the arrangement of FIG. 6, the modulation can be detected by using four photodetectors, $D_1$ through $D_4$. Each photodetector measures the optical intensity at the output from one of the paths through an interferometer. As shown, photodetectors $D_1$ and $D_4$ monitor the outputs of one interferometer (the "$D_1/D_4$ interferometer") and photodetectors $D_2$ and $D_3$ monitor the outputs of the other interferometer (the "$D_2/D_3$ interferometer"). The $D_1/D_4$ interferometer is matched to different by a quarter wavelength of the source. Hence the two receiving interferometers are in quadrature.

It might be noted that, in relation to this arrangement, the curve shown in FIG. 7 would be produced by plotting the difference of the outputs of either $D_1$ and $D_4$ or $D_2$ and $D_3$.

The phase or frequency modulation is recovered by monitoring the outputs of the detectors $D_2$ and $D_3$ of the $D_2/D_3$ interferometer. As soon as the sum of those outputs starts to rise, an error signal is generated. The error signal is used in a feedback loop which adjusts the path difference for both interferometers to return the sum of the outputs of the detectors $D_2$ and $D_3$ to zero. It does this for instance by moving one of the retroreflectors. The error signal itself provides a detection mechanism for the phase or frequency modulation.

The intensity modulation meanwhile can be simply recovered from the difference between the outputs of the detectors $D_1$ and $D_4$ of the $D_1/D_4$ interferometer. The two outputs respectively give a DC component plus modulation intensity component but there is a phase inversion with respect to the detected modulation intensity which has occurred due to beam splitting which affects one arm only of the $D_1/D_4$ interferometer. Hence when the difference between the two outputs is used, the DC component is cancelled but the modulation intensity component is doubled.

This arrangement has the advantage that it rejects signals that are intensity modulated which are not generated by the transmitting interferometer because the phase modulation of the transmitting interferometer is being exactly tracked. To achieve this rejection characteristic, the power splitting ratio of 1:1 between the two arms of each interferometer, including the one at the transmitter and both at the receiver, should preferably be used. The power splitter at the receiver input (marked "Input Splitter" in FIG. 6) does not however need to be 1:1 and it might be found preferable to adjust this power splitting ratio so as to yield the best phase/frequency and intensity demodulation available.

In the above, optical paths through both interferometers in the receiver are adjusted to track phase or frequency modulation by moving a component It will be understood that there are alternative arrangements in which a path length change can be achieved by variation of refractive index rather than by physical movement and in some circumstances this might be preferred. For instance, if one of the arms of each interferometer passes parallel to the other, it might be found preferable to insert a component which changes optical path length in both arms simultaneously under electrical or thermal control, for instance by changing the refractive index of an electro-optic or thermo-optic material of the component.

In an arrangement such as that shown in FIG. 7, it is possible to convey both voice and data information at the same time from the same transmitter, for instance using phase or frequency modulation for voice and using intensity modulation for data.

Wavelength Division Multiplexing Hybrid

Referring to FIG. 8, it is also possible to use embodiments of the present invention together with wavelength division multiplexing (WDM).

The specification of the International patent application published under the number WO 0141346, entitled Multichannel Optical Communication System and Method Utilizing Wavelength and Coherence Multiplexing" dated 2001-06-07 discloses a method and system for transmission of several coherence division multiplexed (CDM) optical signals via one WDM transmission channel of a multichannel WDM telecommunication system. A broadband optical source generates light within the spectral range of at least one WDM transmission channel. Several CDM channels share this spectral range to transmit and detect phase modulated optical signals through optical fibre links.

It is however possible to use a spread spectrum signal 800 which extends across a spectrum much wider than a wavelength channel. The principle is illustrated in FIG. 8 which shows (in FIG. 8*a*) the spectrum of WDM channels 805 and the optical spread spectrum signal, together with (in FIG. 8*b*) a possible receiver structure 810. FIG. 8*a* shows the use of an optical spectrum for CDM signals which is much wider than any of the individual WDM channels. The receiver shown in FIG. 8*b* will remove the WDM channels and then demodulate the remaining optical spectrum using one or more interferometers. The fact that some optical power from the spread spectrum signal 800 has been extracted from the signal by the optical filter which extracts the WDM channel 805 is not that important because the information in the differential time delay system is encoded in the full spectrum of the optical spread spectrum.

Thus both WDM and time-delay difference (CDM) systems can be used over the same optical channel yielding higher capacity communication and approaching the theoretical limit of the optical communication channel capacity.

Interferometric Sensing

In addition to the use of embodiments of the invention in voice and data communication channels, transmitters and receivers of the same general type can be used in telemetry for environmental parameters. For example, several interferometers with different respective optical path imbalances can be connected to a network to sense environmental parameters. The unique path imbalance of each interferometer serves to identify it to a receiver. These parameters, such as pressure, temperature, vibration, magnetic field, electric field can be detected if they cause a change in the time delay difference, phase and/or a differential shift in the optical sensing interferometer and can effectively be transmitted as data signals. The receiver used for such telemetry systems has the same structure as the one used for communication as described in this invention but will generally use different signal processing techniques for gathering and interpreting the data appropriately.

An embodiment of the invention thus might be described as an optical network as described in claim 1 of the accompanying claims, for use in sensing one or more environmental parameters and transmitting an information-carrying optical communication signal wherein the information is representative of each said parameter, the transmitting/receiving apparatus being adapted to sense said one or more environmental parameters as interferometric modulation and to transmit said signal comprising said modulation.

The invention claimed is:

1. An optical network for carrying communication signals to or from at least two end points in optical form, the network being adapted to provide voice communications and comprising:
   i) at least first and second end points, each comprising transmitting/receiving apparatus and having an address in the network; and
   ii) at least one optical source for delivering optical power to the transmitting/receiving apparatus of at least said first end point for conversion to electrical power at the transmitting/receiving apparatus and for transmitting an optical signal carrier to the transmitting/receiving apparatus of at least said first end point,
   wherein:
   (iii) the transmitting/receiving apparatus of the first end point comprises an interferometer for applying interferometric modulation comprising a voice signal and the address of the second end point to the optical signal carrier to provide an optical communication signal comprising the voice signal for subsequent transmission over the network to the second end point;

at least one power conversion device for converting received optical power to electrical power; and at least one electrical storage device for storing at least a portion of the converted optical power; and (iv) the transmitting/receiving apparatus of the second end point comprises an interferometer for detecting interferometric modulation in said information-carrying optical communication signal received over the network so as to receive said voice signal.

2. An optical network according to claim 1 wherein the transmitting/receiving apparatus of the first end point comprises a voice transducer for use in said interferometric modulation.

3. An optical network according to claim 1 wherein, in use, said interferometric modulation comprises frequency modulation.

4. Optical transmitting/receiving apparatus for use in said first end point of a network according to claim 1 to receive said optical power, wherein said apparatus also comprises an amplitude modulator to change the amplitude of said optical signal carrier so as to provide amplitude modulation.

5. An optical network for carrying communication signals to or from at least two end points in optical form, the network comprising:
   i) at least first and second end points, each comprising transmitting/receiving apparatus; and
   ii) at least one optical source for delivering optical power to the transmitting/receiving apparatus of at least one of said end points for conversion to electrical power at the transmitting/receiving apparatus and for transmitting an optical signal carrier to the transmitting/receiving apparatus of at least said first end point,
   wherein the transmitting/receiving apparatus of the first end point comprises an interferometer for applying interferometric modulation to the optical signal carrier for subsequent transmission over the network as an information-carrying optical communication signal and the transmitting/receiving apparatus of the second end point comprises an interferometer for detecting interferometric modulation in said information-carrying optical communication signal received over the network; and
   wherein, in use, the optical signal carrier is used partly at the transmitting/receiving apparatus of at least one of the end points for conversion of delivered optical power to electrical power.

6. An optical network for carrying communication signals to or from at least two end points in optical form, the network comprising:
   i) at least first and second end points, each comprising transmitting/receiving apparatus and having an address in the network; and
   ii) at least one optical source for delivering optical power to the transmitting/receiving apparatus of at least one of said end points for conversion to electrical power at the transmitting/receiving apparatus and for transmitting an optical signal carrier to the transmitting/receiving apparatus of at least said first end point,
   wherein the transmitting/receiving apparatus of the first end point comprises an interferometer for applying interferometric modulation comprising information and an address to the optical signal carrier to provide an information-carrying optical communication signal addressed to the address of the second end point for subsequent transmission over the network to said address and the transmitting/receiving apparatus of the second end point comprises an interferometer for detecting the interferometric modulation in said addressed, information-carrying optical communication signal received over the network, so as to receive the information; and
   wherein, in use, said interferometric modulation comprises one or more interference fringes created by passing an optical carrier through the interferometer of the first end point.

7. An optical network for carrying communication signals to or from at least two end points in optical form, for use in sensing one or more environmental parameters and transmitting said information-carrying optical communication signal wherein the information is representative of each said parameter, the network comprising:
   i) at least first and second end points, each comprising transmitting/receiving apparatus; and
   ii) at least one optical source for delivering optical power to the transmitting/receiving apparatus of at least one of said end points for conversion to electrical power at the transmitting/receiving apparatus and for transmitting an optical signal carrier to the transmitting/receiving apparatus of at least said first end point,
   wherein the transmitting/receiving apparatus of the first end point comprises an interferometer for applying interferometric modulation to the optical signal carrier for subsequent transmission over the network as an information-carrying optical communication signal and the transmitting/receiving apparatus of the second end point comprises an interferometer for detecting interferometric modulation in said information-carrying optical communication signal received over the network, and
   wherein the transmitting/receiving apparatus of the first end point is adapted to sense said one or more environmental parameters as interferometric modulation and to transmit said information-carrying optical communication signal comprising said modulation.

8. Optical transmitting/receiving apparatus for use in an end point of an optical network, the transmitting/receiving apparatus being adapted for receiving optical power and for transmitting an information-carrying optical communication signal comprising a voice signal, the network being adapted for carrying said communication signal, the network comprising:
   i) at least first and second end points, each comprising transmitting/receiving apparatus and having an address in the network; and
   ii) at least one optical source for delivering optical power to the transmitting/receiving apparatus of at least said first end point for conversion to electrical power at the transmitting/receiving apparatus and for transmitting an optical signal carrier to said transmitting/receiving apparatus,
   wherein the transmitting/receiving apparatus for use in said first end point comprises:
   a) an interferometer for applying interferometric modulation comprising a voice signal and the address of the second end point to the optical signal carrier to provide the information-carrying optical communication signal comprising a voice signal, for subsequent transmission over the network to the transmitting/receiving apparatus of the second end point, which apparatus comprises an interferometer for detecting interferometric modulation in said information-carrying optical communication signal so as to receive said voice signal,
   b) at least one power conversion device for converting received optical power to electrical power, and c) at least one electrical storage device for storing at least a portion of the converted optical power.

9. Optical transmitting/receiving apparatus according to claim 8, further comprising an additional optical source.

10. Optical transmitting/receiving apparatus according to claim 8, said apparatus being provided with a local electrical power source.

11. Optical transmitting/receiving apparatus according to claim 8, for use in said first end point, wherein the optical paths in the interferometer are mismatched, in use, by an optical path difference which is greater than the coherence length of the optical signal carrier carrying the modulation.

12. Optical transmitting/receiving apparatus for use in an end point of an optical network, the transmitting/receiving apparatus being adapted to receive optical power and to transmit an information-carrying optical communication signal comprising a voice signal, the network being adapted for carrying said communication signal, the network comprising:
   i) at least first and second end points, each comprising transmitting/receiving apparatus and having an address in the network; and
   ii) at least one optical source for delivering optical power to the transmitting/receiving apparatus of at least said first end point for conversion to electrical power at the transmitting/receiving apparatus and for transmitting an optical signal carrier to said transmitting/receiving apparatus, wherein the transmitting/receiving apparatus for use in said first end point comprises:
   a) an interferometer for applying interferometric modulation to the optical signal carrier to provide the information-carrying optical communication signal addressed to the address of the second end point, for subsequent transmission over the network to the transmitting/receiving apparatus of the second end point, which apparatus comprises an interferometer for detecting interferometric modulation in said information-carrying optical communication signal so as to receive said voice signal, and
   b) at least one power conversion device for converting received optical power to electrical power and applying the electrical power to drive one or more components of the transmitting/receiving apparatus.

13. Optical transmitting/receiving apparatus according to claim 12, for use in said first end point, wherein the optical paths in the interferometer are mismatched, in use, by an optical path difference which is greater than the coherence length of the optical signal carrier carrying the modulation.

14. Optical transmitting/receiving apparatus for use in an end point of an optical network to receive optical power and an optical signal carrier, the network comprising:
   i) at least first and second end points, each comprising transmitting/receiving apparatus; and
   ii) at least one optical source for delivering optical power to the transmitting/receiving apparatus of at least said first end point for conversion to electrical power at the transmitting/receiving apparatus and for transmitting an optical signal carrier to said transmitting/receiving apparatus, wherein the transmitting/receiving apparatus for use in said first end point comprises an interferometer for applying interferometric modulation to the optical signal carrier for subsequent transmission over the network as an information-carrying optical communication signal to the transmitting/receiving apparatus of the second end point, which apparatus of the second end point comprises an interferometer for detecting interferometric modulation in said information-carrying optical communication signal, and
   wherein the interferometer of the transmitting/receiving apparatus for use in said first end point comprises means to change the length of at least one arm of the interferometer to create a frequency shift in said optical signal carrier so as to provide said information-carrying optical communication signal.

15. Optical receiving apparatus for use in an end point of an optical network, the receiving apparatus being adapted to receive optical power and an information-carrying optical communication signal, the network being adapted for carrying said communication signal, the network comprising:
   i) at least first and second end points, the first end point comprising transmitting/receiving apparatus and the second end point comprising the optical receiving apparatus; and
   ii) at least one optical source for delivering optical power to the transmitting/receiving apparatus of at least one end point for conversion to electrical power at the transmitting/receiving apparatus and for transmitting an optical signal carrier to said transmitting/receiving apparatus of at least said first end point, wherein the transmitting/receiving apparatus of said first end point comprises an interferometer for applying interferometric modulation to the optical signal carrier for subsequent transmission over the network as the information-carrying optical communication signal to the optical receiving apparatus, and
   wherein said optical receiving apparatus is provided with at least two interferometers for detecting interferometric modulation in a received information-carrying optical communication signal, a first interferometer being arranged for use in detecting a first type of modulation in the received signal and a second interferometer being arranged for use in detecting a second type of modulation in the received signal.

16. Optical receiving apparatus according to claim 15 wherein the first type of modulation comprises phase or frequency modulation.

17. Optical receiving apparatus according to claim 15 wherein the second type of modulation comprises intensity modulation.

18. Optical receiving apparatus according to claim 15 wherein the at least two interferometers are differently unbalanced, the discrepancy between the path length differences of the interferometers being equal to, or approximately equal to, a quarter of a central wavelength of an optical carrier carrying the received signal.

19. Optical receiving apparatus according to claim 15 further comprising a path length control component for producing a path length change in relation to both interferometers of the at least two interferometers, at the same time.

20. Optical receiving apparatus according to claim 19 wherein the at least two interferometers share at least one reflector as the path length control component, the arrangement being such that movement of the shared reflector results in said path length change in relation to both interferometers.

21. Optical receiving apparatus according to claim 15 wherein the at least two interferometers are both provided by one shared pair of reflectors, at least one of which is a retroreflector, the apparatus further comprising at least one input beam splitter, the arrangement being such as to provide multiple optical paths in relation to the reflectors which can be brought together as outputs to constitute said at least two interferometers.

22. Optical receiving apparatus according to claim 19, comprising tracking means for tracking phase or frequency modulation in the received signal and a feedback arrangement for controlling the path length control component such that both interferometers are adjusted to follow said phase or frequency modulation.

23. Optical transmitting apparatus for use with apparatus according to claim 15, the transmitting apparatus comprising an intensity modulator for applying intensity modulation to said optical signal carrier so as to provide said information-carrying optical communication signal.

24. An optical receiver adapted to receive optical power and an information-carrying optical communication signal, for use in transmitting/receiving apparatus at an end point of an optical network, the network being adapted for carrying said communication signal and comprising:
   i) at least first and second end points each having an address in the network, the first end point comprising transmitting/receiving apparatus and the second end point comprising the optical receiver; and
   ii) at least one optical source for delivering optical power to the transmitting/receiving apparatus of at least one end point for conversion to electrical power at the transmitting/receiving apparatus and for transmitting an optical signal carrier to said transmitting/receiving apparatus of at least said first end point,
wherein the transmitting/receiving apparatus of said first end point comprises an interferometer for applying interferometric modulation to the optical signal carrier to provide the information-carrying optical communication signal addressed to the address of the second end point, for subsequent transmission over the network to the optical receiver, said receiver comprising a filter for filtering out one or more wavelength ranges from said communication signal, and
   wherein the receiver further comprises an interferometer for use in detecting, in a portion of said communication signal outside said one or more wavelength ranges, interferometric modulation generated using a transmitting interferometer with a characteristic path length difference so as to provide the address of the second end point.

25. Optical transmitting/receiving apparatus for use in a first end point of an optical network, the transmitting/receiving apparatus being adapted for receiving optical power and for transmitting an information-carrying optical communication signal, the network being adapted for carrying said communication signal and comprising:
   i) at least said first end point and a second end point, each comprising transmitting/receiving apparatus; and
   ii) at least one optical source for delivering optical power to the transmitting/receiving apparatus of at least said first end point for conversion to electrical power at the transmitting/receiving apparatus and for transmitting an optical signal carrier to said transmitting/receiving apparatus,
wherein the transmitting/receiving apparatus for use in said first end point comprises:
   a) an interferometer for applying interferometric modulation to the optical signal carrier for subsequent transmission over the network as the information-carrying optical communication signal,
   b) at least one power conversion device for converting received optical power to electrical power,
   c) at least one electrical storage device for storing at least a portion of the converted optical power, and
   d) a further interferometer for detecting interferometric modulation in an information-carrying optical communication signal received over the network.

26. Optical transmitting/receiving apparatus for use in a first end point of an optical network, the transmitting/receiving apparatus being adapted to receive optical power and to transmit an information-carrying optical communication signal, the network being adapted for carrying said communication signal and comprising:
   i) at least said first end point and a second end point, each comprising transmitting/receiving apparatus; and
   ii) at least one optical source for delivering optical power to the transmitting/receiving apparatus of at least said first end point for conversion to electrical power at the transmitting/receiving apparatus and for transmitting an optical signal carrier to said transmitting/receiving apparatus,
wherein the transmitting/receiving apparatus for use in said first end point comprises:
   a) an interferometer for applying interferometric modulation to the optical signal carrier for subsequent transmission over the network as the information-carrying optical communication signal,
   b) at least one power conversion device for converting received optical power to electrical power and applying the electrical power to drive one or more components of the transmitting/receiving apparatus, and
   c) a further interferometer for detecting interferometric modulation in an information-carrying optical communication signal received over the network.

27. Optical receiving apparatus for receiving optical power and optical signals delivered to an end point over an optical network which carries communication signals to or from the one end point in optical form, the optical network comprising:
   i) the end point comprising transmitting/receiving apparatus;
   ii) at least one optical source for delivering optical power to the transmitting/receiving apparatus for conversion to electrical power at the transmitting/receiving apparatus and for transmitting an optical signal carrier to the transmitting/receiving apparatus,
   wherein the transmitting/receiving apparatus is adapted to apply interferometric modulation to the optical signal carrier for subsequent transmission over the network as an information-carrying optical communication signal;
   wherein the optical receiving apparatus is provided with at least two interferometers for detecting interferometric modulation in a received signal, a first interferometer being arranged for use in detecting a first type of modulation in the received signal and a second interferometer being arranged for use in detecting a second type of modulation in the received signal;
   wherein the optical receiving apparatus further comprises a path length control component for producing a path length change in relation to both interferometers at the same time; and
   wherein the at least two interferometers share at least one reflector as the path length control component, the arrangement being such that movement of the shared reflector results in said path length change in relation to both interferometers.

28. Optical receiving apparatus for receiving optical power and optical signals delivered to an end point over an optical network which carries communication signals to or from the one end point in optical form, the optical network comprising:
   i) the end point comprising transmitting/receiving apparatus;
   ii) at least one optical source for delivering optical power to the transmitting/receiving apparatus for conversion to electrical power at the transmitting/receiving apparatus and for transmitting an optical signal carrier to the transmitting/receiving apparatus, wherein the transmitting/receiving apparatus is adapted to apply interferometric modulation to the optical signal carrier for subsequent transmission over the network as an information-carrying optical communication signal;

wherein the optical receiving apparatus is provided with at least two interferometers for detecting interferometric modulation in a received signal, a first interferometer being arranged for use in detecting a first type of modulation in the received signal and a second interferometer being arranged for use in detecting a second type of modulation in the received signal; and wherein the at least two interferometers are both provided by one shared pair of reflectors, at least one of which is a retroreflector, the apparatus further comprising at least one input beam splitter, the arrangement being such as to provide multiple optical paths in relation to the reflectors which can be brought together as outputs to constitute said at least two interferometers.

29. Optical receiving apparatus for receiving optical power and optical signals delivered to an end point over an optical network which carries communication signals to or from the one end point in optical form, the optical network comprising:

i) the end point comprising transmitting/receiving apparatus;

ii) at least one optical source for delivering optical power to the transmitting/receiving apparatus for conversion to electrical power at the transmitting/receiving apparatus and for transmitting an optical signal carrier to the transmitting/receiving apparatus, wherein the transmitting/receiving apparatus is adapted to apply interferometric modulation to the optical signal carrier for subsequent transmission over the network as an information-carrying optical communication signal;

wherein the optical receiving apparatus is provided with at least two interferometers for detecting interferometric modulation in a received signal, a first interferometer being arranged for use in detecting a first type of modulation in the received signal and a second interferometer being arranged for use in detecting a second type of modulation in the received signal;

wherein the optical receiving apparatus further comprises a path length control component for producing a path length change in relation to both interferometers at the same time; and wherein the optical receiving apparatus further comprises tracking means for tracking phase or frequency modulation in the received signal and a feedback arrangement for controlling the path length control component such that both interferometers are adjusted to follow said phase or frequency modulation.

* * * * *